United States Patent
Jennings, Jr.

[11] Patent Number: 5,327,973
[45] Date of Patent: Jul. 12, 1994

[54] METHOD FOR VARIABLE DENSITY ACIDIZING

[75] Inventor: Alfred R. Jennings, Jr., Plano, Tex.

[73] Assignee: Mobil Oil Corporation, Fairfax, Va.

[21] Appl. No.: 994,852

[22] Filed: Dec. 22, 1992

[51] Int. Cl.⁵ ............................................. E21B 43/27
[52] U.S. Cl. .................................. 166/307; 166/305.1
[58] Field of Search ...................... 166/271, 305.1, 307

[56] References Cited

U.S. PATENT DOCUMENTS

| | | | |
|---|---|---|---|
| 2,137,167 | 11/1938 | Lang | 166/307 X |
| 2,237,131 | 4/1941 | Carr | 166/307 |
| 2,796,936 | 6/1957 | Sayre, Jr. et al. | 166/307 |
| 2,850,098 | 9/1958 | Moll et al. | 166/307 |
| 2,869,642 | 1/1959 | McKay et al. | 166/307 X |
| 3,076,762 | 2/1963 | Dill | 166/307 |
| 3,233,672 | 2/1966 | Carpenter | 166/307 |
| 3,354,957 | 11/1967 | Every et al. | 166/307 |
| 3,550,686 | 12/1970 | Knox | 166/307 |
| 4,387,770 | 6/1983 | Hill | 166/305.1 |
| 4,787,456 | 11/1988 | Jennings, Jr. et a. | 166/281 |
| 4,883,124 | 11/1989 | Jennings, Jr. | 166/307 |

*Primary Examiner*—George A. Suchfield
*Attorney, Agent, or Firm*—Alexander J. McKillop; George W. Hager, Jr.; Charles A. Malone

[57] ABSTRACT

A process for acidizing a formation where variable density acids are utilized. A substantially low density non-reactive fluid is loaded into an interval of the formation to be treated. Afterwards, a high density first stage acid is injected into the interval. Thereafter, a low density spacer fluid is injected into the interval being treated. Next, a second stage high density acid having a density lower than the first stage acid is injected into said interval. Subsequently, a low density spacer is injected into the interval. Volume increments are repeatedly injected with decreasing fluid densities until a desired zone has been treated. The entire treatment is then overflushed with an inert high density fluid.

22 Claims, 1 Drawing Sheet

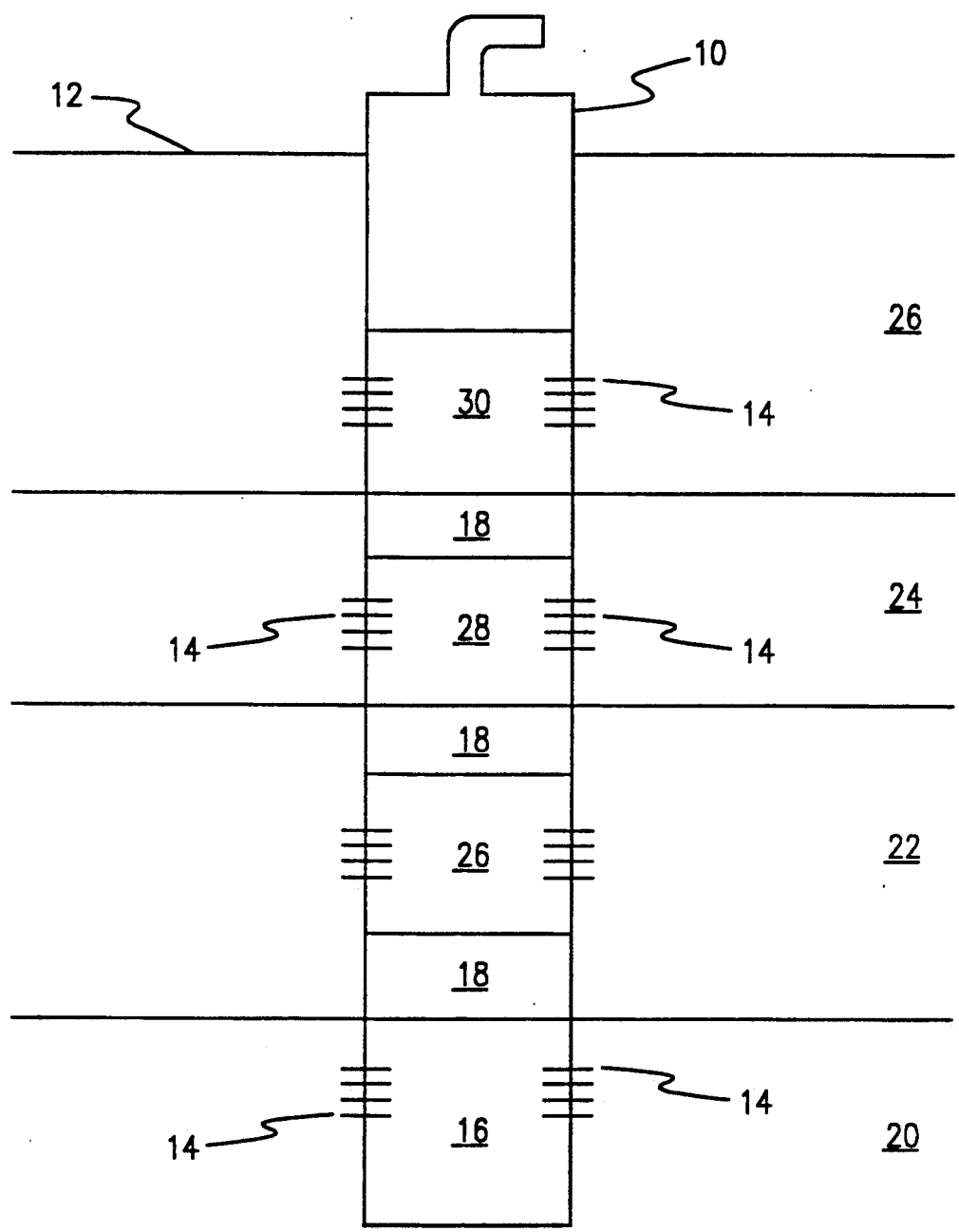

5,327,973

METHOD FOR VARIABLE DENSITY ACIDIZING

FIELD OF THE INVENTION

This invention is directed to the treatment of a subterranean hydrocarbonaceous fluid containing formation where an acid of different densities is used to improve the effectiveness of matrix acidizing.

BACKGROUND OF THE INVENTION

It is a common practice to acidize subterranean formations in order to increase the permeability thereof. For example, in the petroleum industry, it is conventional to inject an acidizing fluid into a well in order to increase the permeability of a surrounding hydrocarbon-bearing formation and thus facilitate the flow of hydrocarbonaceous fluids into the well from the formation or the injection of fluids such as gas or water, from the well into the formation. Such acidizing techniques may be carried out as "matrix acidizing" procedures or as "acid-fracturing" procedures.

In acid fracturing the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the fractures reaction of the acid within the formation with little or no permeability increase being due to mechanical disruptions within the formation as in fracturing.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical disruptions within the formation as in fracturing.

In yet another technique involving acidizing, the formation is fractured. Thereafter, an acidizing fluid is injected into the formation at fracturing pressures to extend the created fracture. The acid functions to dissolve formation materials forming the walls of the fracture, thus increasing the width and permeability thereof.

In most cases, acidizing procedures are carried out in calcareous formations such as dolomites, limestones, and dolomitic sandstones, etc. One difficulty encountered in the acidizing of such a formation is presented by the rapid reaction rate of the acidizing fluid with those portions of the formation with which it first comes into contact. This is particularly serious in matrix acidizing procedures. As the acidizing fluid is forced from the well into the formation, the acid reacts rapidly with the calcareous material immediately adjacent to the well. Thus, the acid becomes spent before it penetrates into the formation a significant distance from the well. For example, in matrix acidizing of a limestone formation, it is common to achieve maximum penetration with a live acid to a depth of only a few inches to a foot from the face of the wellbore. This, of course, severely limits the increase in productivity or injectivity of the well.

In order to increase the penetration depth, it has heretofore been proposed to add a reaction inhibitor to the acidizing fluid. For example, in U.S. Pat. No. 3,233,672 issued to N. F. Carpenter, there is disclosed an acidizing process in which inhibitor, such as alkyl-substituted carboximides and alkyl-substituted sulfoxides, is added to the acidizing solution. Another technique for increasing the penetration depth of an acidizing solution is that disclosed by U.S. Pat. No. 3,076,762 issued to W. R. Dill, wherein solid, liquid, or gaseous carbon dioxide is introduced into the formation in conjunction with the acidizing solution. The carbon dioxide acts as a coolant, thus retarding the reaction rate of the acid with the formation carbonates. Also, the carbon dioxide is said to become solubilized in the acidizing solution, thus resulting in the production of carbonic acid which changes the equilibrium point of the acid-carbonate reaction to accomplish a retarding effect.

An additional procedure disclosed in U.S. Pat. No. 2,850,098 issued to Moll et al. involves the removal of contaminants from a water well and the adjacent formation through the injection of gaseous hydrogen chloride. Still another technique for acidizing a calcareous formation is disclosed in U.S. Pat. No. 3,354,957 issued to Every et al. In this process liquid anhydrous hydrogen chloride is forced from a well into the adjacent formations. The liquid hydrogen chloride vaporizes within the formation and the resulting gas dissolves in the formation to form hydrochloric acid which then attacks the formation.

In hydrocarbonaceous bearing formations, it is frequently necessary to use acid or some reactive fluid to remove wellbore and near wellbore damage. In deep and extensive intervals it is difficult to completely cover the zone of interest up and down the wellbore. Variations in extent of damage, permeability, and mineral content affect the reactivity of the material used to clean up the wellbore damage. Part of the interval will likely take a major part of the injected fluid leaving other parts untreated.

"Diverting" materials such as perforation ball sealers, benzoic acid, or resin are frequently used to cause acid or reactive fluid to flow into other parts of the interval. However, since most diverting solids are only slowly soluble in produced fluids, they may damage the interval being stimulated.

Consequently, even with favorable well response only partial success is currently being achieved with conventional damage removal treatments.

Therefore, what is needed is a method for acid treating a formation where all desired intervals receive a required amount of acid for stimulating purposes and which method does not require the use of diverting materials.

SUMMARY OF THE INVENTION

In the practice of this invention, a desired low density non-reactive aqueous salt solution is injected into into a perforated vertical wellbore where some of it enters an interval to be treated. Afterwards, an acid solution having a density substantially higher than the non-reactive aqueous salt solution is injected into the wellbore where it falls below any remaining salt solution in the wellbore. Following the injection of the high density acid, a spacer volume of an aqueous salt solution, having a density lower than the acid's density, is injected into the wellbore. Thereafter, a second acid solution having a density lower than the first acid solution but higher than the aqueous salt solution, is injected into the wellbore. Subsequently, an aqueous salt solution having a density lower than the second acid solution, is injected into the wellbore.

Injection of the acid solutions of decreased density and a spacer volume of aqueous salt solution is repeated until all intervals of the formation are treated as desired. Once all intervals have been treated as desired, a non-reactive aqueous salt solution having a density higher than any of the acid or salt solutions previously utilized, is injected into the wellbore thereby forcing all of the previous solutions into the formation.

It is therefore an object of this invention to provide for an acidizing method where different acid stages can be effectively modified to fit a variety of zone types, thicknesses, and depths.

It is another object of this invention to provide for an acidizing method which does not utilize diverting agents so as to facilitate cleanup after completing the acidizing method.

It is still yet another object of this invention to maintain and increase the permeability of a carbonate formation during matrix acidizing by the use of acids with variable densities thereby ensuring treatment of all desired intervals in a multiple interval formation.

It is yet still another object of this invention to obtain a more efficient matrix acidizing of a formation while substantially reducing the volume of acid utilized.

BRIEF DESCRIPTION OF THE DRAWINGS

The drawing is a schematic representation which shows acid and non-reactive fluids in a well at different levels or intervals of a formation.

DESCRIPTION OF THE PREFERRED EMBODIMENTS

In the practice of this invention referring to the drawing, a pore volume of a low density non-reactive aqueous salt solution is injected into wellbore 10 in amount sufficient to load all of the productive intervals with said salt solution. This salt solution must be compatible with the producing formation and will have a density of about 12 pounds per gallon. Thereafter, a first stage pore volume of a high density acid 16 sufficient to etch or treat a carbonate containing formation is introduced into wellbore 10 where it enters productive interval 20 via perforations 14 until it reaches a level above perforations 14 in wellbore 10. The density of the first stage acid is higher than the density of the non-reactive aqueous salt solution and any of the acid stages that will be subsequently injected into the wellbore. The density of the first stage acid is about 11.5 to about 12.0 pounds per gallon.

Since the first stage acid has the highest density, it forces the non-reactive aqueous salt solution or low density spacer and any other fluids into the formation as it falls to the bottom of wellbore 10. Subsequently, another low density spacer 18 is directed into wellbore 10 where it remains over the first stage acid due to its density which is less than the density of the acid. The density of spacer 18 will be about 11.0 to about 11.5 pounds per gallon. Although spacer 18 remains above the first stage acid, it does not enter the perforations which communicate with productive interval 22. The acid and low density spacer are injected into the wellbore and formation at a pressure less than the fracturing pressure of the formation. Upon entering the formation the acid attacks the carbonate containing formation and etches channels which radiate outwardly from the well.

While the first stage acid and spacer remain in wellbore 10, a second stage acid having a density less than the first stage acid and spacer therebelow, is injected into wellbore 10 where it enters productive interval 22 via perforations therein until it fills the wellbore to a desired level thereabove. The density of this second stage acid will be about 10.5 to about 11.0 pounds per gallon. Afterwards, a spacer having a density lower than the second stage acid is injected into the wellbore until it reaches a level just below perforations which communicate with productive interval 24. When this occurs, injection of this spacer ceases. The density of this spacer will be about 10.0 to about 10.5 pounds per gallon.

In order to acidize another productive interval, a third stage acid 28 having a density less than the second stage acid and spacer, is injected into the wellbore whereupon it enters productive interval 24 via perforations 14 and fills the wellbore area adjacent thereto. Once the wellbore is filled with acid adjacent to productive interval 24, spacer 18 is placed over the third stage acid. This spacer will have a density less than the third stage acid. The density of the third stage acid will be about 9.5 to about 10.0 pounds per gallon, while the density of the spacer thereabove will be about 9.0 to about 9.5 pounds per gallon.

Afterwards, a fourth stage acid 30 is injected into the wellbore so as to enter productive interval 26 via perforations 14. Injection of this fourth stage acid is continued until it has entered interval 26 and filled the wellbore just above the perforations therein. The density of the fourth stage acid is less than the density of the third stage acid and spacer thereabove and will be about 8.5 to about 9.0 pounds per gallon.

Where there are additional productive intervals in the formation, these acidizing and spacer sequences can be repeated until all desired productive intervals have been treated. By placing the acid and spacer with lessened density values into the formation and wellbore as described above, all productive intervals of a lengthy pay in a vertical or deviated wellbore can be acidized so as to increase productivity. When all productive intervals have been treated, all of the acid stages and spacers remaining in the wellbore are overflushed with a non-reactive aqueous salt solution having a density greater than any of said stages of spacers. This overflush salt solution will have a density of about 8.5 to about 12.0 pounds per gallon. Being heavier than the other acid stages and spacers, the overflush salt solution forces them into the formation. After the treatment is completed, the well is placed on production.

In lieu of injecting the acid and spacer into the wellbore, a coiled tubing can be used to more effectively and precisely place the acid or spacer into the wellbore. The coiled tubing can consist of a one-inch or other small pipe which is wound on a spool at the surface of wellbore 10. Either the acid or the spacer can be placed therein and deposited at a desired location within the wellbore.

The acid stage utilized may be any of the aqueous solutions of acid commonly employed for acidizing subterranean calcareous formations. For example, the solution of acid may be an aqueous solution of hydrochloric acid. Commonly, an aqueous solution of hydrochloric acid is employed for acidizing subterranean calcareous formations. The preferred acid for utilization herein comprises hydrochloric acid. Although hydrochloric acid is preferred, hydroflouric and certain organic acids can be utilized. These organic acids include formic, acetic and oxalic. When hydrochloric acid is utilized, it should be in a concentration of about 5 to about 28 volume percent. A concentration of 28 volume percent is preferred. The use of a hydrochloric acid composition in matrix acidizing is disclosed in U.S. Pat. No. 4,787,456 which issued to Jennings, Jr. et al. on Nov. 29, 1988. This patent is hereby incorporated by reference herein.

The amount of acid solution employed will vary according to the radial distance from the well to the interval that is to be acidized and will be up to about 15 feet, but in most cases will not exceed about 10 feet from the well or wellbore. The amount of acid solution in a stage will also vary according to the extent to which the material of the formation is to be dissolved. Preferably, the amount of acid would be one hydrocarbon pore volume of the interval of the formation to be acidized. However, lesser amounts may be employed. Generally, the amount employed will be that ordinarily employed in conventional, commercial acidizing operations.

In addition to aqueous acid solutions, aromatic compounds such as xylene or toluene and mixtures thereof can be mixed with the acid to form low density dispersions for injecting into productive intervals requiring acid when practicing this invention. "PARAGON®" acid dispersions can be used as low density dispersions for this purpose. These dispersions are marketed by Halliburton Services located in Duncan, Okla. When utilized, the acid can be made a desired density and mixed with an aromatic compound such as xylene or toluene. Acids for use herein include hydrochloric, hydroflouric, formic, acetic, and oxalic.

A non-reactive fluid or low density spacer which may be used herein includes salts of alkali or alkaline-earth metals in aqueous solutions and mixtures thereof. Zinc chloride solutions may also be used. The non-reactive fluid or low density spacer should have a density of a least 0.1 less than the density of the acid stage therebelow. Although sodium chloride, potassium chloride, calcium chloride, and zinc chloride may be used, bromides of these salts may also be utilized. The specific gravity of the acid stage can range from about 1.05 to about 1.10 at room temperature. These salts are disclosed in U.S. Pat. No. 4,883,124 which issued to A. R. Jennings, Jr. on Nov. 28, 1989. This patent is hereby incorporated by reference herein.

Obviously, many other variations and modifications of this invention, as previously set forth, may be made without departing from the spirit and scope of this invention as those skilled in the art will readily understand. Such variations and modifications are considered part of this invention and within the purview and scope of the appended claims.

What is claimed is:

1. A method for acidizing a formation where variable density acids are utilized comprising:
   a) loading via a wellbore all productive intervals of the formation with a low density non-reactive fluid which fluid is compatible with the composition of the formation;
   b) injecting a first stage acid into the wellbore which acid has a density greater than the non-reactive fluid and is sufficient in density to flow to the bottom of the wellbore so as to be in fluid communication with a lower productive interval of the formation;
   c) injecting thereafter a low density spacer or non-reactive fluid into the wellbore which spacer has a density less than the first stage acid;
   d) injecting next a second stage acid into the wellbore which acid has a density less than the first stage acid spacer injected in step c) which precludes liquid acids from mixing with each other as the second stage acid enters a productive interval above the interval in step b);
   e) injecting a spacer into the wellbore above the second stage acid which spacer has a density less than the spacer in step c) and previously injected acid stages thereby preventing mixing of the liquids;
   f) repeating the acid stages and spacer injections with decreasing densities of liquids until all desired productive intervals have been treated with acid; and
   g) overflushing all intervals of the formation with a non-reactive fluid that has a density greater than any of the previously injected acid stages or spacers thereby forcing them into the intervals and cleaning out the wellbore.

2. The method as recited in claim 1 where the wellbore is vertical or deviated.

3. The method as recited in claim 1 where the acid is hydrochloric acid.

4. The method as recited in claim 1 where the non-reactive fluid or spacer comprises an aqueous salt solution selected from a member of the group consisting of sodium chloride, potassium chloride, zinc chloride, sodium bromide, potassium bromide, or zinc bromide.

5. The method as recited in claim 1 where the density of the first stage acid is from about 11.5 to about 12.0 pounds per gallon.

6. The method as recited in claim 1 where the density of the second stage acid is from about 10.5 to about 11.0 pounds per gallon.

7. The method as recited in claim 1 where in step f) a third stage acid is injected into the wellbore which acid has a density of about 9.5 to about 10.0 pounds per gallon.

8. The method as recited in claim 1 where in step f) a third and fourth stage acid are injected into the wellbore which third stage acid has a density greater than the fourth stage acid with a spacer therebetween which fourth stage acid has a density of about 8.5 to about 9.0 pounds per gallon.

9. The method as recited in claim 1 where the density range of the non-reactive fluid or spacer utilized above the stages of acid is from about 9.0 to about 12.0 pounds per gallon.

10. The method as recited in claim 1 where the formation is a carbonate containing formation.

11. The method as recited in claim 1 where the acid utilized in the stages of acid is an acid dispersion comprised of a mixture of xylene or toluene and a member selected from the group consisting of hydrochloric acid, oxalic acid, formic acid, acetic acid, or hydrofluoric acid and mixtures thereof.

12. The method as recited in claim 1 wherein the acid utilized is an acid selected from a member of the group consisting of hydrochloric acid, oxalic acid, formic acid, acetic acid, or hydrofluoric acid and mixtures thereof.

13. A method for acidizing a formation where variable density acids are utilized comprising:
   a) loading via a wellbore all productive intervals of the formation with a low density non-reactive fluid which fluid is compatible with the composition of the formation;
   b) injecting a first stage acid into the wellbore which acid has a density greater than the non-reactive fluid and is sufficient in density to flow to the bottom of the wellbore so as to be in fluid communication with a lower productive interval of the formation;

c) injecting thereafter a low density spacer or non-reactive fluid into the wellbore which spacer has a density less than the first stage acid;

d) injecting next a second stage acid into the wellbore which acid has a density less than the first stage acid spacer injected in step c) which precludes liquid acids from mixing with each other as the second stage acid enters a productive interval above the interval in step b); and e) overflushing all intervals of the formation with a non-reactive fluid that has a density greater than any of the previously injected acid stages or spacers thereby forcing them into the intervals and cleaning out the wellbore.

14. The method as recited in claim 13 where the wellbore is vertical or deviated.

15. The method as recited in claim 13 where the acid is hydrochloric acid.

16. The method as recited in claim 13 where the non-reactive fluid or spacer comprises an aqueous salt solution selected from a member of the group consisting of sodium chloride, potassium chloride, zinc chloride, sodium bromide, potassium bromide, or zinc bromide.

17. The method as recited in claim 13 where the density of the first stage acid is from about 11.5 to about 12.0 pounds per gallon.

18. The method as recited in claim 13 where the density of the second stage acid is from about 10.5 to about 11.0 pounds per gallon.

19. The method as recited in claim 13 where the density range of the non-reactive fluid or spacer utilized above the stages of acid is from about 9.0 to about 12.0 pounds per gallon.

20. The method as recited in claim 13 where the formation is a carbonate containing formation.

21. The method as recited in claim 13 where the acid utilized in the stages of acid is an acid dispersion comprised of a mixture of xylene or toluene and a member selected from the group consisting of hydrochloric acid, oxalic acid, formic acid, acetic acid, or hydrofluoric acid and mixtures thereof.

22. The method as recited in claim 13 where the acid utilized is an acid selected from a member of the group consisting of hydrochloric acid, oxalic acid, formic acid, acetic acid, or hydrofluoric acid and mixtures thereof.

* * * * *